A. T. JACOBSSON.
LENS MOUNTING.
APPLICATION FILED JAN. 18, 1921.
1,417,326. Patented May 23, 1922.
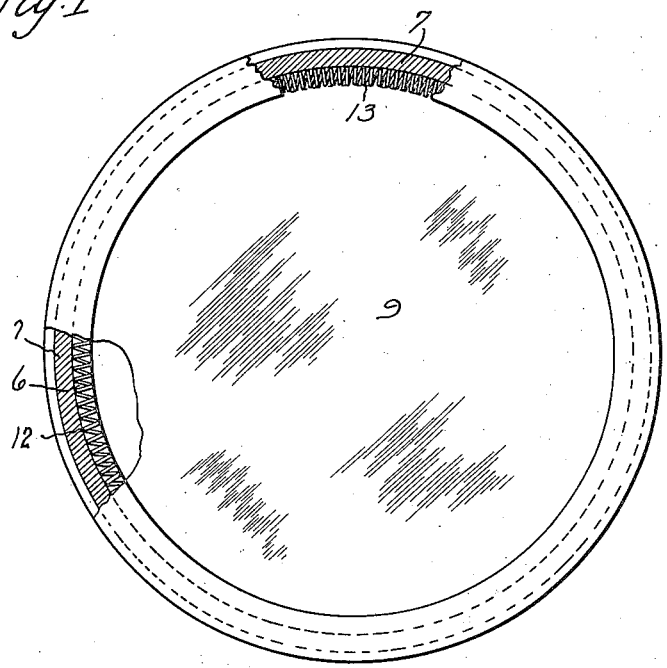
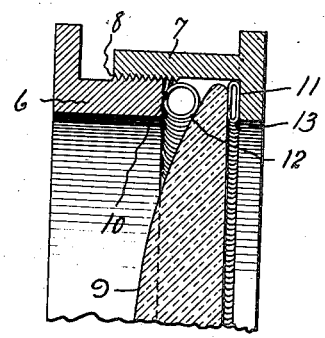
Inventor
A. T. Jacobsson
By John A. Bommhardt
Atty.

UNITED STATES PATENT OFFICE.

AXEL T. JACOBSSON, OF CLEVELAND, OHIO.

LENS MOUNTING.

1,417,326.  Specification of Letters Patent.  Patented May 23, 1922.

Application filed January 13, 1921. Serial No. 438,098.

*To all whom it may concern:*

Be it known that I, AXEL T. JACOBSSON, a subject of the Government of Sweden, residing at Cleveland, in the county of Cuyahoga and State of Ohio, have invented certain new and useful Improvements in Lens Mountings, of which the following is a specification.

This invention relates to lens mountings and is particularly adapted and intended for use on lenses which are subjected to great heat such as those used on motion picture machines. The object of the invention is to provide a yielding mounting for the lens which will prevent breakage of the lens due to unequal expansion between the lens and the frame or mounting.

The invention is illustrated in the accompanying drawing in which Fig. 1 is a front elevation, partly in section, of the mounting. Fig. 2 is a detail in cross-section.

The lens mounting consists of two flanged ring members 6 and 7 which are screwed together as indicated at 8, the one fitting within the other. The lens 9 is confined at its edge between the inner end 10 of the ring 6 and a flange 11 on the ring 7, a coiled copper wire spring 12 being interposed between the edge of the lens and the face or shoulder 10 at one side, and a flattened copper tube gasket 13 interposed between the edge of the lens and the flange 11 at the opposite side. The member 12 is a coiled spring which may be made of copper, because of its high conductivity, but may be made of other material, and for the same reason the tubular gasket 13 is preferably made of copper, but may be made of other material.

A mounting so constructed will equalize the temperature conditions and will provide a yielding support for the lens in its mounting, permitting different expansion between the respective parts, without cracking the lens as with rigid mountings, since the spring 12 and the tube 13 will expand or contract under variations of pressure incident to different temperatures and thereby prevent the injurious consequence referred to.

I claim:

1. The combination with an optical lens having a convex face, of a mounting comprising inner and outer rings screwed together, and a coiled spring packing confined between the inner end of the inner ring and the convex face of the lens.

2. The combination with a condensing lens having a plane face and a convex face, of a mounting comprising inner and outer rings screwed together, the outer ring having an inwardly projecting flange, a flattened metallic tubular gasket between the plane face of the lens and said flange, and a coiled spring packing between the convex face of the lens and the inner end of the inner ring.

In testimony whereof, I affix my signature in presence of two witnesses.

AXEL T. JACOBSSON.

Witnesses:
JOHN F. SIMPSON,
JOHN A. BOMMHARDT.